(12) United States Patent  
Nakagawa (10) Patent No.: US 8,305,589 B2  
(45) Date of Patent: Nov. 6, 2012

(54) IMAGE PROCESSING APPARATUS, METHOD, AND SYSTEM FOR GENERATING IMAGE DATA FROM PRINTS

(75) Inventor: Jun Nakagawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1185 days.

(21) Appl. No.: 12/135,525

(22) Filed: Jun. 9, 2008

(65) Prior Publication Data

US 2009/0021755 A1  Jan. 22, 2009

(30) Foreign Application Priority Data

Jul. 18, 2007 (JP) ................................. 2007-187019

(51) Int. Cl.
- *G06F 15/00* (2006.01)
- *G06K 1/00* (2006.01)
- *G06K 15/02* (2006.01)
- *H04N 1/60* (2006.01)

(52) U.S. Cl. ........................................ 358/1.11; 358/1.9

(58) Field of Classification Search .................. None
See application file for complete search history.

(56) References Cited

U.S. PATENT DOCUMENTS 7,782,487 B2 * 8/2010 Nakanishi et al. ............. 358/1.9
7,973,944 B2 * 7/2011 Hasuike ......................... 358/1.1

FOREIGN PATENT DOCUMENTS

| JP | 2000-242461 | 9/2000 |
| JP | 2004-320361 | 11/2004 |

* cited by examiner

*Primary Examiner* — Douglas Tran  
(74) *Attorney, Agent, or Firm* — Finnegan, Henderson, Farabow, Garrett & Dunner, L.L.P.

(57) ABSTRACT

An image processing apparatus comprises: an image transformation section which generates, from print data, image data of character or line drawing of gradation value n1 and image data of a photographic image of gradation value n2 (n2>n1); an encoding section which encodes the image data of the character or the line drawing of the gradation value n1, and generates the encoded image data of the character or the line drawing of the gradation value n2; an attribute adding section which generates attribute data indicating an attribute of each of images with respect to the encoded image data of the character or the line drawing of the gradation value n2 and the generated image data of the photographic image of the gradation value n2, and adds the attribute data to each of the encoded image data of the character or the line drawing and the generated image data of the photographic image; and a synthesizing section which synthesizes the encoded image data of the character or the line drawing to which the attribute data is added and the generated image data of the photographic image to which the attribute data is added, and outputs the synthesized data.

18 Claims, 9 Drawing Sheets

: PHOTOGRAPHIC IMAGE (600dpi, 8BIT)

: CHARACTER OR LINE DRAWING (1200dpi, 1BIT)

FIG. 7A

PHOTOGRAPHIC IMAGE : 600dpi, 8BIT(1 PIXELS)

FIG. 7B

CHARACTER OR LINE DRAWING : 1200dpi, 1BIT(4 PIXELS)

IMAGE PROCESSING APPARATUS, METHOD, AND SYSTEM FOR GENERATING IMAGE DATA FROM PRINTS

BACKGROUND OF THE INVENTION

1. Field of the Invention

The invention relates to an image processing apparatus, a data processing method, and a printing system.

2. Description of Related Art

Generally, in order to obtain a high quality image, with respect to a photographic image, though a low resolution is acceptable, multi gradation is required. On the other hand, with respect to a character image, though a low gradation is acceptable, a high resolution is required. Accordingly, since the conditions required according to an attribute of an image is different, when a photographic image and a character image mix in one image, in data format of a same resolution or a same gradation, a high quality output image can not be obtained with respect to images of all attribute.

Conventionally, after discriminating image portions of the photograph and the character, different processes are performed to the photograph image and the character image respectively, and then the portion of the photographic image is made to low resolution and high gradation, the portion of the character image is made to the high resolution and the low gradation (e.g. see Japanese Patent Laid-Open No. 2000-242461, Japanese Patent Laid-Open No. 2004-320361).

However, as above mentioned, when the different processes are performed, since it is necessary to prepare the process compositions (hardware) of two systems corresponding to each process, the cost will increase.

Also, in the printer, and so on, it is constructed so as to store images to be output in a memory once, and read out the images from the memory in order. Though the compression process is performed to the image data so as to store as many image data as possible when storing and, the extension process is performed when outputting the images, a lossy compression is often utilized in order to increase the compression ratio of the image. However, when the same lossy compression is performed to the photographic image and the character image, the problem of losing the shape of the image portion of the character of the high resolution arises.

Accordingly, the countermeasure performing switching to a lossless compression for the character image portion that needs the high resolution or, the countermeasure performing the lossless compression to the photographic image and character image, etc. are taken.

However, in the former case, since the processing system for the lossless compression and the lossy compression is needed, the problem of high costs remains, while the control becomes complicated. Also, in the latter case, since the compression ratio becomes low in comparison with the lossy compression, there is the problem that the amount of image data to be stored in the printer is limited.

SUMMARY OF THE INVENTION

It is, therefore, a main object of the present invention to enable to output a high quality image by a simple composition even when different resolutions and/or gradations mix in one image.

In accordance with a first aspect of the present invention, an image processing apparatus comprises:

an image transformation section which generates, from print data, image data of character or line drawing of gradation value n1 and image data of a photographic image of gradation value n2 (n2>n1);

an encoding section which encodes the image data of the character or the line drawing of the gradation value n1, and generates the encoded image data of the character or the line drawing of the gradation value n2;

an attribute adding section which generates attribute data indicating an attribute of each of images with respect to the encoded image data of the character or the line drawing of the gradation value n2 and the generated image data of the photographic image of the gradation value n2, and adds the attribute data to each of the encoded image data of the character or the line drawing and the generated image data of the photographic image; and a synthesizing section which synthesizes the encoded image data of the character or the line drawing to which the attribute data is added and the generated image data of the photographic image to which the attribute data is added, and outputs the synthesized data.

Also, In accordance with a second aspect of the present invention, a data processing method in an image processing apparatus, comprises the steps of:

generating, from print data, image data of character or line drawing of gradation value n1 and image data of a photographic image of gradation value n2 (n2>n1);

encoding the image data of the character or the line drawing of the gradation value n1, and generating the encoded image data of the character or the line drawing of the gradation value n2;

generating attribute data indicating an attribute of each of images with respect to the encoded image data of the character or the line drawing of the gradation value n2 and the generated image data of the photographic image of the gradation value n2, and adding the attribute data to each of the encoded image data of the character or the line drawing and the generated image data of the photographic image; and synthesizing the encoded image data of the character or the line drawing to which the attribute data is added and the generated image data of the photographic image to which the attribute data is added, and outputs the synthesized data.

Also, in accordance with a third aspect of the present invention, a printing system comprises:

a print control apparatus for processing received print data; and an image forming apparatus for printing and outputting an image based on image data, wherein the print control apparatus comprises:

an image transformation section which generates, from print data, image data of character or line drawing of gradation value n1 and image data of a photographic image of gradation value n2 (n2>n1);

an encoding section which encodes the image data of the character or the line drawing of the gradation value n1, and generates the encoded image data of the character or the line drawing of the gradation value n2;

an attribute adding section which generates attribute data indicating an attribute of each of images with respect to the encoded image data of the character or the line drawing of the gradation value n2 and the generated image data of the photographic image of the gradation value n2, and adds the attribute data to each of the encoded image data of the character or the line drawing and the generated image data of the photographic image; and a synthesizing section which synthesizes the encoded image data of the character or the line drawing to which the attribute data is added and the generated image data of the photographic image to which the attribute data is added, and outputs the synthesized data.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

DESCRIPTION OF THE PREFERRED EMBODIMENTS

Hereinafter, embodiments relating to an image processing apparatus data processing method and a printing system according to the present invention will be described with reference to figures.

In this embodiment, an example in a case that functions of the image processing apparatus are applied to image processing sections in the printer controller and the MFT (Multi Function Peripheral) is explained.

First, the compositions are explained.

Figure 1:
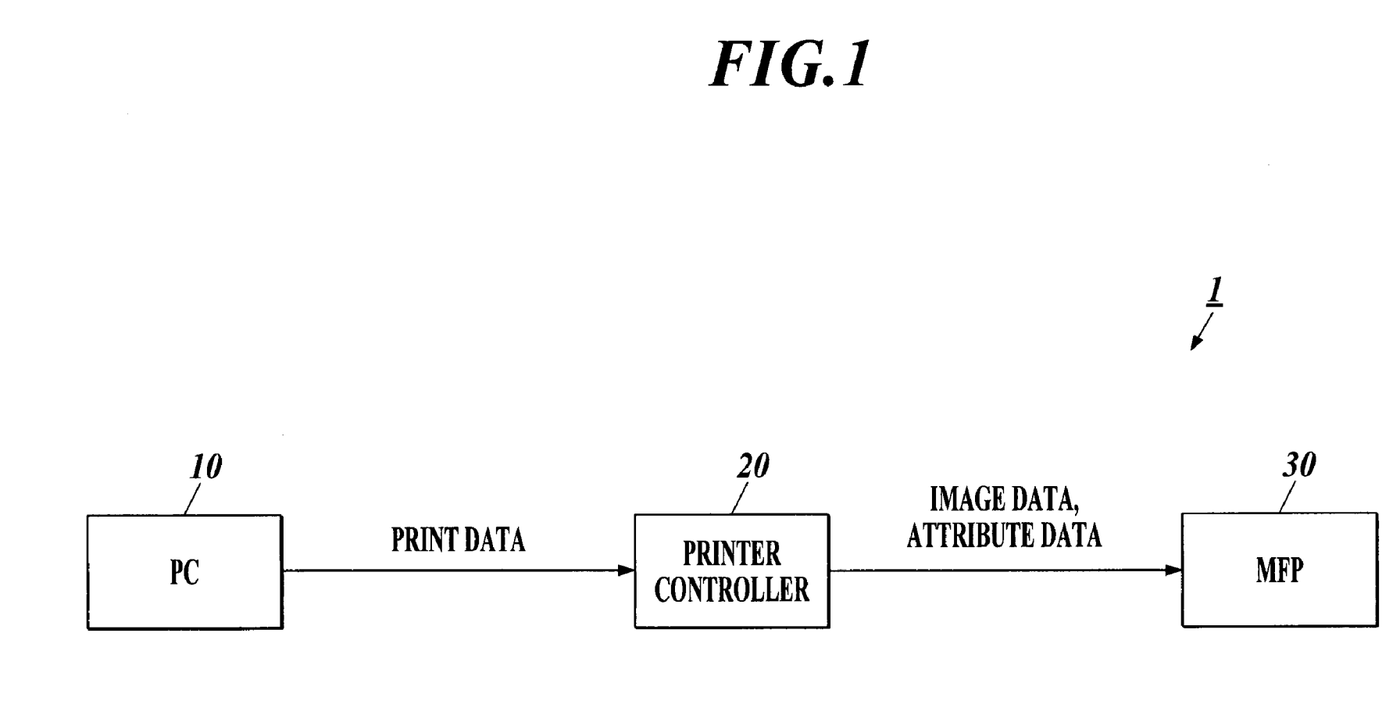
FIG. 1 is a view showing a printing system.

FIG. 1 is view showing printing system 1 for performing print output of an image.

The printing system 1 shown in FIG. 1 is a system in which data to be output (hereinafter referred to as output object data), which is generated by PC (Personal Computer) 10 is converted to the image data, and the MFP 30 performs the print output of the image according to the image data.

The PC 10 has functions of performing an application software for a word processing, drawing, or an editing of the photographic image, and so on, and functions capable of generating various output object data such as text (character), line drawing, the photographic image, and so on.

Also, the PC 10 has functions of performing a printer driver software, and converts the output object data generated by the application software to print data in the processes by the printer driver software, and outputs it to the printer controller 20. The print data is data represented by page description language such as PDL (Page Description Language), and so on.

The printer controller 20 has an image processing section for generating the image data from the print data, and outputting the generated the image data to the MFP 30.

The MFP 30 has an image processing section, after performing various processes to the image data by the image processing section, performs the print output of an image on a print sheet according to the processed image data.

Hereinafter, in view of FIG. 2, the printer controller 20 and the MFP 30 relating to this embodiment are explained in detail.

Figure 2:
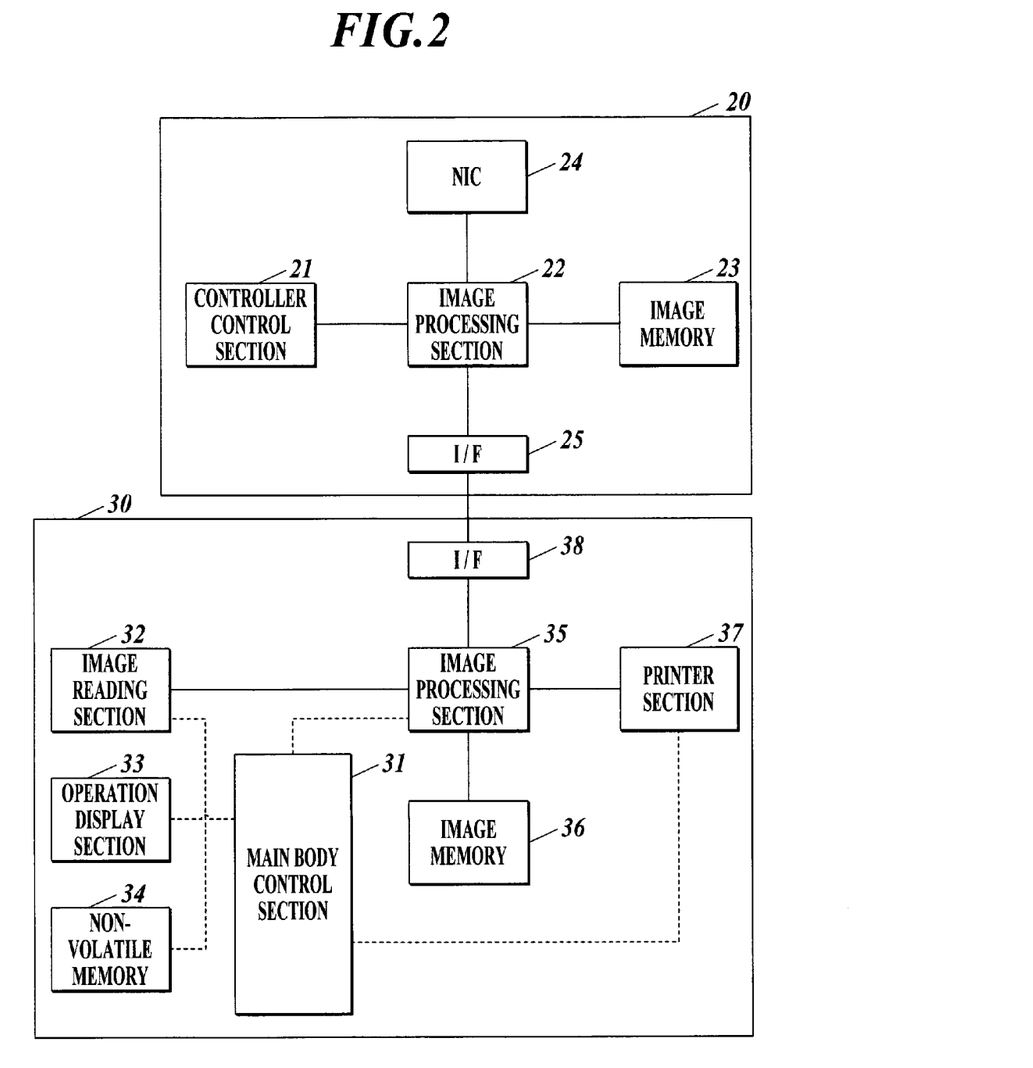
FIG. 2 is a view showing a printer controller relating to this embodiment and functional compositions of MFP.

As shown in FIG. 2, the printer controller 20 is composed of a controller control section 21, an image processing section 22, an image memory 23, a NIC (Network Interface Card) 24, and an I/F 25.

The MFP 30 is composed of a main body control section 31, an image reading section 32, an operation display section 33, a non-volatile memory 34, an image processing section 35, an image memory 36, a printer section 37, and an I/F 38.

The printer controller 20 and the MFP 30 is capable of mutually performing data communication via the I/Fs 25 and 38.

First, the printer controller 20 is explained.

The controller control section 21 is composed of a CPU (Central Processing Unit), a RAM (Random Access Memory), and so on, and performs a centralized control for operations of each section while performing the various operations, in cooperation with the program stored in storage section not shown.

Figure 3:
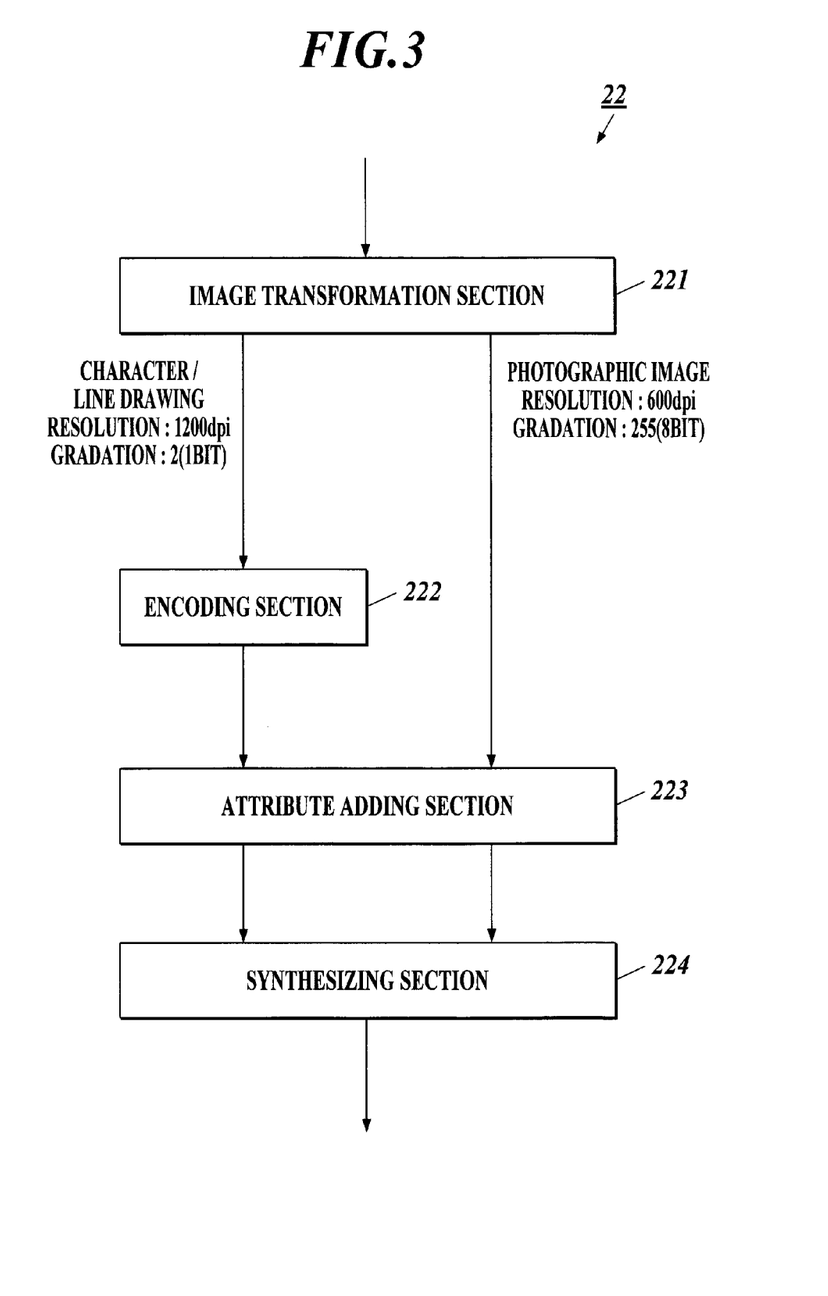
FIG. 3 is a view showing the functional composition of an image processing section of the printer controller.

As shown in FIG. 3, the image processing section 22 is composed of an image transformation section 221, an encoding section 222, an attribute adding section 223, a synthesizing section 224, and so on. The image transformation section 221 performs a rasterizing process according to the print data inputted from the PC 10, and generates the image data. Then, the image transformation section 221 extracts the image data of the character or the line drawing from the generated image data, and outputs it to the encoding section 222. On the other hand, the image transformation section 221 outputs the image data of the photographic image that is extracted together with the image data of the character or line drawing to the attribute adding section 223. The encoding section 222 performs encoding for the image data of the character or the line drawing. The attribute adding section 223 generates attribute data TAG indicating the attribute of the image (the photographic image, the character or the line drawing), and adds the attribute data to the image data of the photographic image and the encoded data (encoded image data) of the character or the line drawing respectively. The synthesizing section 224 synthesizes and outputs the encoded data of the character or the line drawing and the image data of the photographic image to each of which the attribute data TAG is added.

The image memory 23 is a storage section for storing the image data.

The NIC 24 is an interface for communicating with an external device such as the PC 10, and so on, on a network.

The I/F 25 is an interface which mediates the data exchange from/to the MFT 30.

Next, each section of the MFP 30 is explained.

The main body control section 31 is composed of a CPU, a RAM, and so on, and performs a centralized control for operations of each section while performing the various operations in cooperation with the program stored in the non-volatile memory 34.

The image reading section 32 is composed of an ADF (Auto Document Feeder), a scanner, and so on, and performs processes such as reading the image on a document, and generating the image data. The image data generated by the reading process is outputted to the image processing section 35.

The operation display section 33 is composed of a touch panel integrated with a display, and so on. The operation display section 33 displays various operation screens such as a setting screen, and so on, on the display, generates the manipulate signal corresponding to manipulation, and outputs it to the main body control section 31.

The non-volatile memory 34 is a storage section such as a hard disk, and so on. The non-volatile memory 34 stores a program that is performed by the main body control section 31, and data necessary to perform the program, and so on.

Figure 4:
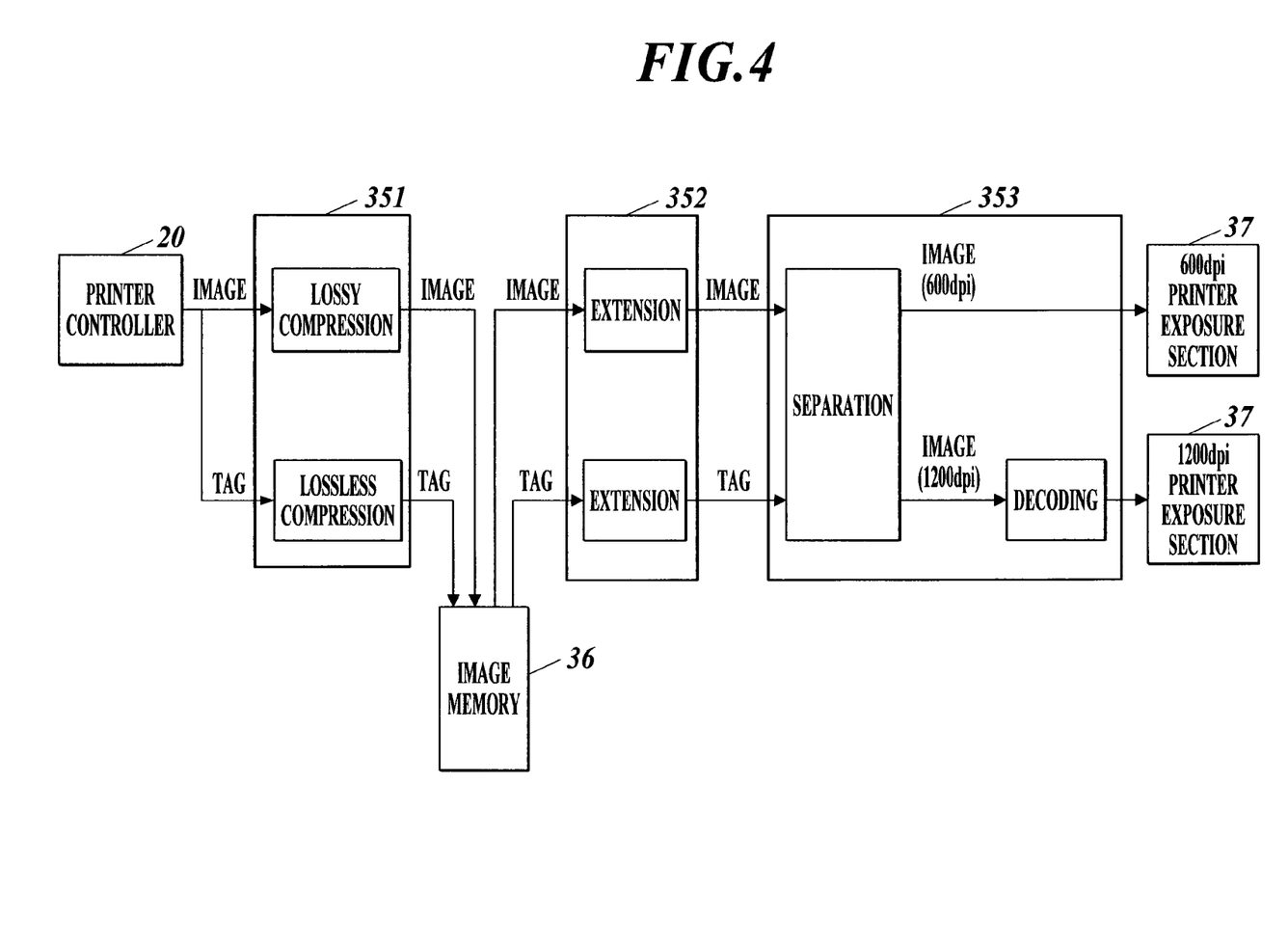
FIG. 4 is a view showing functional compositions of an image processing section of MPF.

As shown in FIG. 4, the image processing section 35 is composed of a compression process section 351, an extension process section 352, an output adjustment section 353, and so on. The compression process section 351 is capable of performing lossy or lossless compression process. The extension process section 352 performs the extension process to the compressed data to which the compression process is performed. The output adjustment section 353 separates the extended image data according to its attribute, and outputs the image data of the photographic image in the present state to the printer section 37, and after the encoded data of the character or the line drawing is encoded, outputs it to the printer section 37.

The image memory 36 is an image storage section having large capacities such as a hard disk, and so on. The image memory 36 stores the image data to which the compression process is performed.

The printer section 37 outputs an image on a print sheet according to the image data by the electrophotographying system. That is, the printer section 37 is composed of an exposure section, a transfer belt, a development section, a fixing section, and so on, and performs exposure by emitting the laser beam from a laser light source of the exposure section, on a photosensitive drum, and then forms the electrostatic latent image. Then, an image output is performed by transferring a toner image obtained by adding toners to the development section to the print sheet. In addition, the printing method may be other methods.

The printer section 37 is capable of processing different resolutions. For example, The printer section 37 is composed of an exposure section 600 dpi and an exposure section for 1200 dpi, and can form the electrostatic latent images of the images of different resolutions respectively.

The I/F 38 is an interface which mediates the data communication from/to the printer controller 20.

Next, the operations are explained.

Figure 5:
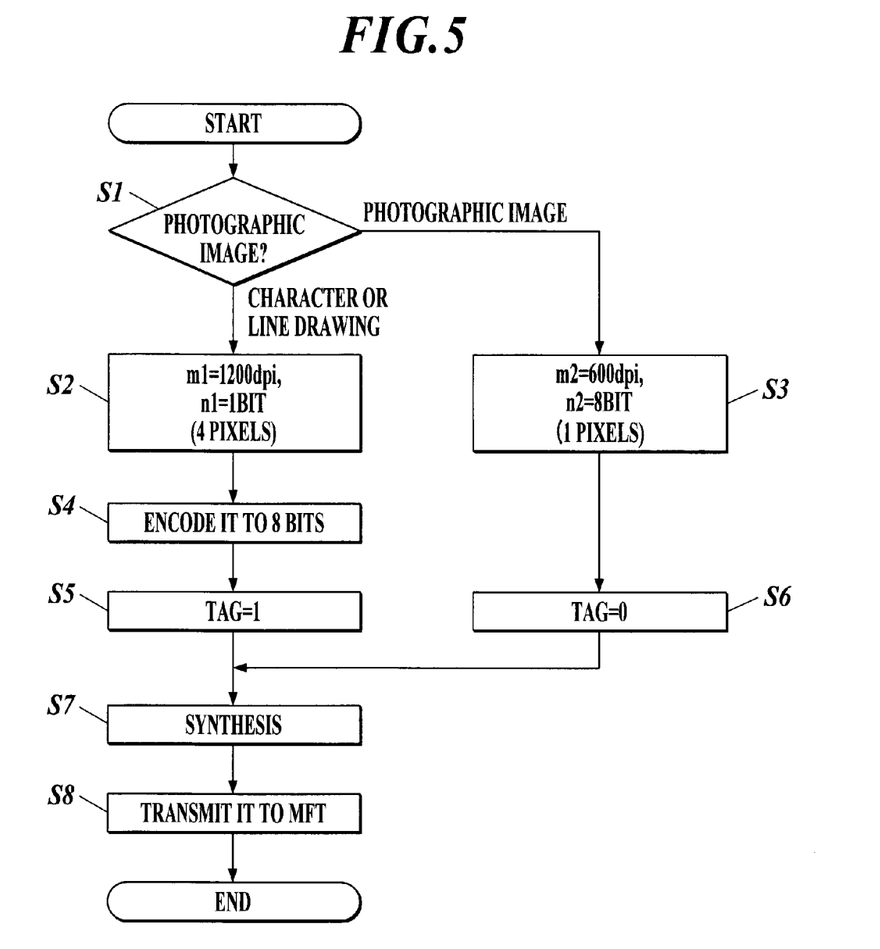
FIG. 5 is a view showing a flowchart of processes of the image processing section of the printer controller.

In view of FIG. 5, the processes to be performed by the printer controller 20 when the output object data is inputted from the PC 10 are explained.

When the print data is inputted from the PC 10 to the printer controller 20 via the NIC 24, the image transformation section 221 of the image processing section 22 performs a rasterizing process. The rasterizing process is a process for generating the image data from the print data. Concretely, in the rasterizing process, a print control command (if PDL data, PDL command) included in the print data is analyzed, the print data is separated in a unit (hereinafter referred to as object) of an image to be drawn to generate a display list. The display list is an intermediate data describing information relating to the object to be drawn.

For example, in the display list, a drawing coordinate, a drawing size, a drawing logic, area information, color data, and so on are described. The drawing coordinate is a coordinate value indicating a printing position of the object within a printing area of one page. The drawing size is a numeric value indicating vertical and horizontal direction sizes of the object. The drawing logic is a parameter for performing calculation of background when drawing (painting out, and so on). The area information is data indicating the data attributes (font, bit map, graphic) of the object. The color data is data indicating colors of the object.

The image transformation section 221 generates the image data for each of colors capable of being outputted by the printer section 37 based on the display list. The image data is generated by setting a pixel value for each of assigned pixels after assigning pixels with respect to the object to be drawn. The position of the pixel is determined by the drawing coordinate, the drawing size, and the area information of the display list, and the pixel value is determined by using the color data and the drawing logic.

Simultaneously, the image transformation section 221 determines whether the image data belongs to any of the character, the line drawing, and the photographic image based on the data attribute of the object indicated by the area information in the display list (step S1). That is, the image transformation section 221 determines that it is the character if the object is the font, that it is the line drawing if the object is vector data, and that it is the photographic image if the object is the bit map.

Then, when performing the rasterizing process, the image transformation section 221 makes the image data of the character or the line drawing having the high resolution and the low gradation, in comparison with the image data of the photographic image (steps S2, S3). There, the resolution and the gradation value of the image data of the character or the line drawing are represented as m1 and n1 respectively, the resolution and the gradation value of the image data of the photographic image are represented as m2 and n2 respectively, and the image data is generated so as to satisfy the conditions (m1>m2, n1<n2) because with respect to the photographic image, the image quality becomes high quality when gradation is high, on the other hand, with respect to the character or the line drawing, the image quality becomes high quality when resolution rather than gradation is high. Hereinafter, an example in a case that the resolution m2 and the gradation value n2 of the image data of the photographic image are 600 dpi and 256 values (8 bit) respectively, and the resolution m1 and the gradation value n1 of the image data of the character or the line drawing are 1200 dpi and 2 values (1 bit) are explained.

Figure 6:
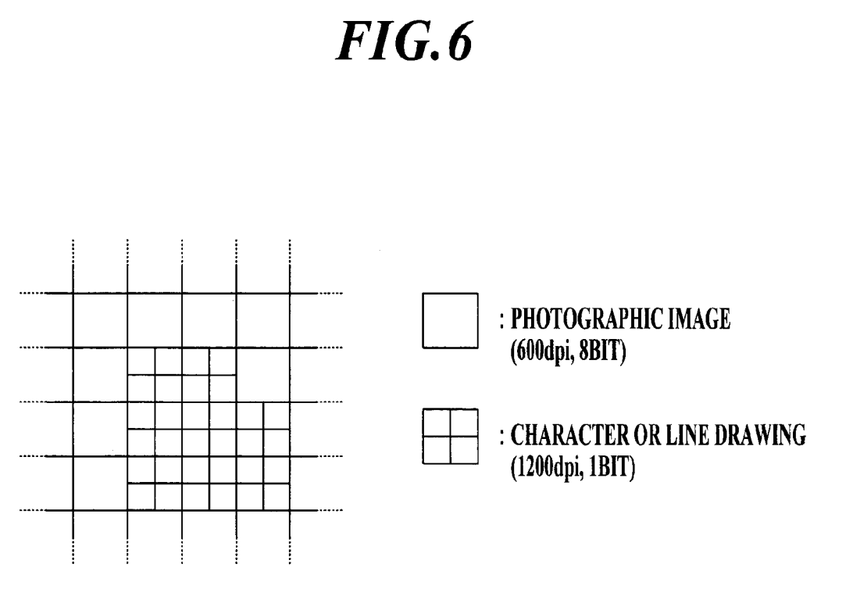
FIG. 6 is a view showing an image example in which portions of a photographic image and a character and line drawing each having different resolution and gradation mix.

In this case, images having different resolutions are included in one image. Since the image portion Of the character or the line drawing has double resolution in comparison with the image portion of the photographic image, as shown in FIG. 6, a size of 1 pixel of the image portion of the photographic image and a size of total 4 pixels for 2×2 pixels relating to the character or the line drawing become same. However, even when the size is same, since the photographic image is high gradation, the amount of data of 1 pixel relating to the photographic image is 8 bits, and the image portion of the character or the line drawing is 4 bits for 4 pixels, that is, the amount of data are different.

Figure 7A:
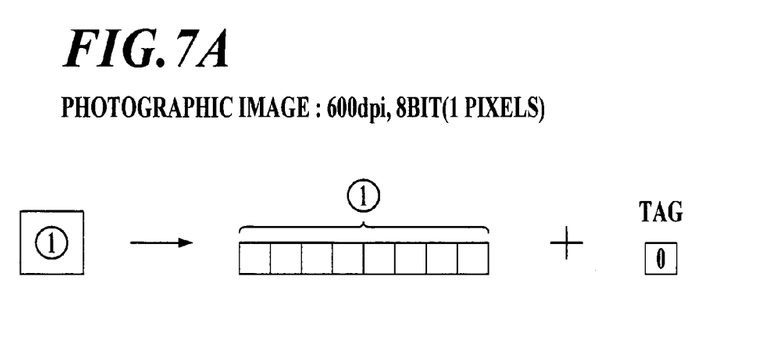
FIG. 7A is a view showing data of the photographic image and the attribute data.

After that, the image transformation section 221 outputs the generated image data of the character or the line drawing to the encoding section 222. On the other hand, the image transformation section 221 outputs the image data of the photographic image to the attribute adding section 223. As shown in FIG. 7A, the image data of the photographic image is image data of 8 bits indicating gradation value n2=256.

The encoding section 222 performs the encoding process to convert the image data of the character or the line drawing to the encoded data of 8 bits (that is, encoded data of the gradation value n2) (step S4). The encoding is performed noting that 4 pixels are one unit. Concretely, as shown in FIG.

7B, data of 4 bits is made by arranging in order from the pixel of upper left among 4 pixels (the order indicating numeral 1 to 4 in FIG. 7B) and arranging in order the data value (the pixel value) of each pixel from the upper bit. Then, data of total 8 bits is generated by further adding the additional data of 4 bits to its lower bits, and then its encoding is performed. the additional data is added to match the amount of data of the character or the line drawing and the amount of the photographic image, and recover the error occurred by the compression process.

Though the lossy compression process is performed to the image data by the MFP 30 side later, the amount of data (the bit number) of the photographic image and the character or the line drawing differ, the structures of the compression processes corresponding to each of the amount of data are needed. In this case, composition sections for two systems should be prepared. Therefore, since even when there is any attribute of the image, the amounts of data are matched to be able to perform the compression process to one image by the same compression method. As shown in FIG. 7A, in the photographic image, the image data for 1 pixel is data of 8 bits. Consequently, the additional data is added to data of 4 bits of the character or the line drawing to obtain 8 bits equal to that of the photographic image.

Also, when the lossy compression process is performed, since it is difficult to completely restore an original image by the extension process, the error may occur in comparison with the original image. Since the photographic image has a large gradation value (256 values=8 bits), it is rare that the image deterioration appears visually when there are many or few errors. However, in a case of the character or the line drawing, since the gradation value is small (2 values=1 bit), even when many or few errors occur, the appearance of dots is changed, and collapse of the shape attracts attention. Therefore, with respect to the character or the line drawing, the additional data is added to the lower bits so as not to generate errors of data of the high order 4 bits of the image portion.

Though the additional data may be any value, since it is considered that the error will occur in any of plus and minus, it is preferable that the value is "1000" (binary number) to deal with all. According to this, it deals with the error within −1000 to +0111 (binary number).

Figure 8:
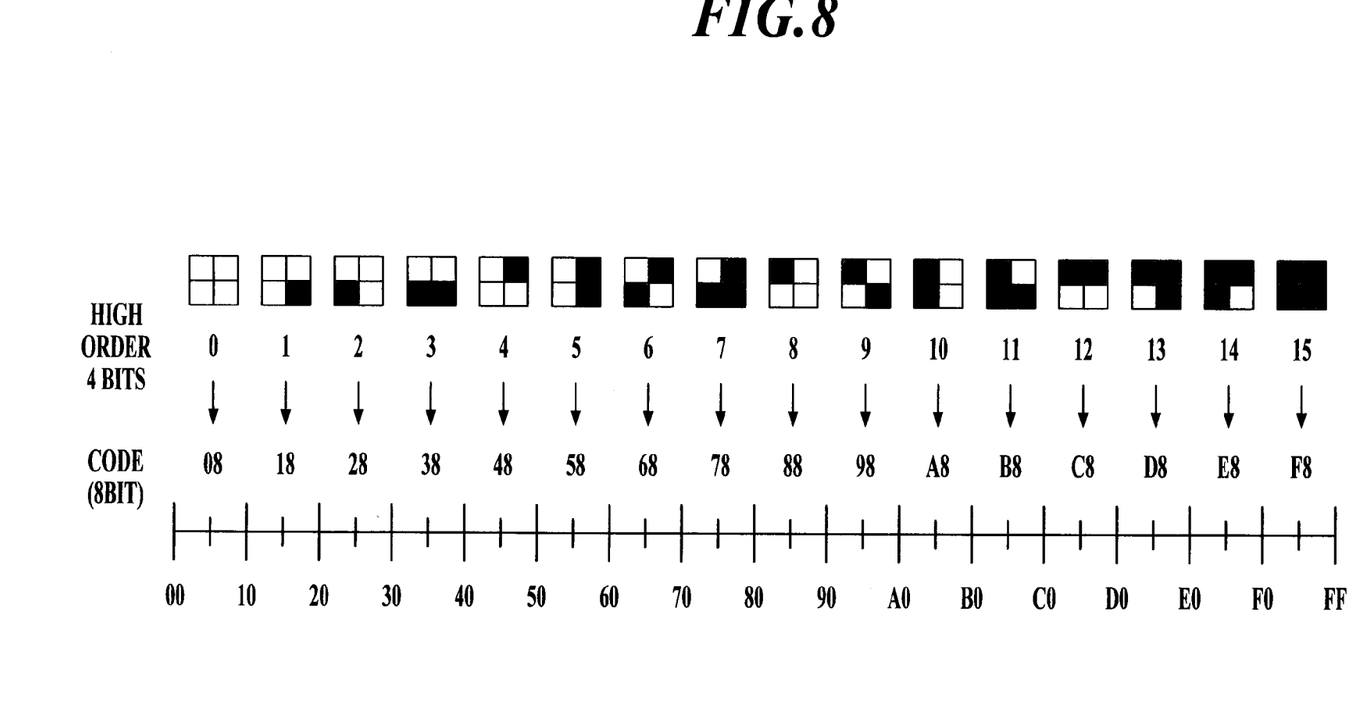
FIG. 8 is a view showing a corresponding relationship between data to be encoded and code.

Next, an encoding is explained.

the encoding is performed based on data value of the high order 4 bits. FIG. 8 shows the corresponding relationship between the data value (decimal number) of the high order 4 bits and the code (hexadecimal number) to be converted. Since all combinations of the data value of four pixels are 16 types, the data value of the high order 4 bits can be a value of 0 to 15. the value obtained by adding the data value of the additional data of the low order 4 bits to this value of the high order 4 bits is represented by hexadecimal number as a converted code. For example, As shown in FIG. 8, when the data value of the high order 4 bits is "5", the data value of the additional data is "8", that code becomes "58".

In addition, the additional data of the low order 4 bits is always same value "8", in spite of the value of the high order 4 bits. Consequently, when the gradation is separated to 16 stages, the converted code is almost the medium value of each stage. In an example shown in FIG. 8, the gradation 0 to FF (hexadecimal number) of 8 bits is divided to 16 stages "00-10, 10-20, . . . , F0-FF". It is understood that each code "08, 18, 28, . . . , F8" is the medium value of each stage.

The encoded data is outputted to the attribute adding section 223.

Figure 7B:
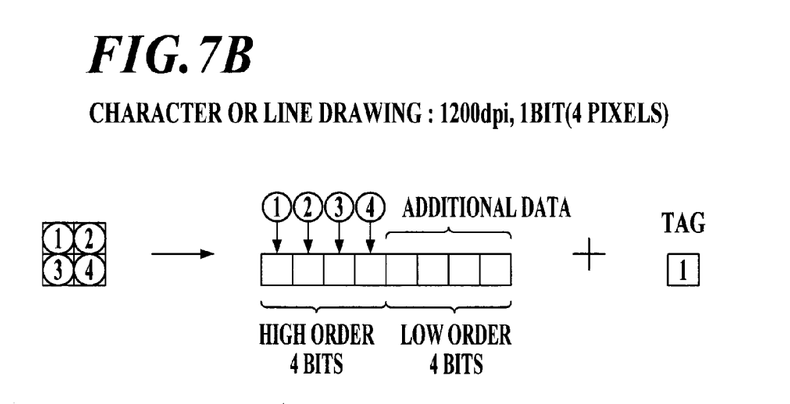
FIG. 7B is a view showing data of the character and the line drawing and the attribute data.

The attribute adding section 223 generates and adds the attribute data TAG (1 bit) indicating the attribute of the image to each image data when the image data of the photographic image is inputted from the image transformation section 221 and the encoded data is inputted from the encoding section 222. That is, with respect to 8 bits of the image data inputted from the image transformation section 221, as shown in FIG. 7A, the attribute data TAG set by TAG=0 is added to the image data to indicate that the image data is the photographic image (step S6). On the other hand, with respect to the encoded data of 8 bits inputted from the encoding section 222, as shown in FIG. 7B, the attribute data TAG set by TAG=1 is added to the image data to indicate that the encoded data belongs to the character or the line drawing (step S5).

Then, the attribute adding section 223 synthesizes the image data of the photographic image and image data of the character or the line drawing to each of which the attribute data TAG is added (step S7) to reconstruct one image data, the synthesized data is outputted to the MFP 30 via the I/F 25 (step S8).

In the MFP 30, the inputted image data (the synthesized data) is stored once in the image memory 36. Then, a print output is performed by reading the image data from the image memory 36.

The processes performed by the image processing section 35 at this time are explained in view of FIG. 4.

As shown in FIG. 4, first, the compression process section 351 performs the compression process to the image data and the attribute data TAG, and reduces the data capacity necessary to store it. At this time, since the image data needs a large data capacity, the lossy compression process such as JPEG 2000, and so on is performed. On the other hand, since the amount of data of the attribute data TAG is small (1 bit), and since it is needed to correctly restore it, the lossless compression process is performed. By this, the compression process section 351 outputs the image data and the attribute data TAG to each of which the compression process is performed to the image memory 36. The image memory 36 memorizes and stores it.

At the timing of performing the print output of the image data stored in the image memory 36, the extension process section 352 reads out the image data to be printed out from the image memory 36, and performs the extension process. As above mentioned, since the methods of the compression process for the image data and the attribute data TAG are different, the extension process is performed according to each of the methods. At this time, since with respect to the image data, since the lossy compression process is performed, some error may occur in the image data before/after the compression process. On the other hand, with respect to the attribute data, since the lossless compression process is performed, the original data will be correctly restored. The extension process section 352 outputs the extended image data and the attribute data TAG to the output adjustment section 353.

The output adjustment section 353 detects the inputted attribute data TAG, and separates the inputted image data to the image data of the character or the line drawing and the image data of the photographic image based on the attribute data TAG. That is, it is discriminated to separate it that the image data to which the attribute data TAG of TAG=1 is the character or the line drawing, and the image data to which the attribute data TAG of TAG=0 is the photographic image.

Figure 9:
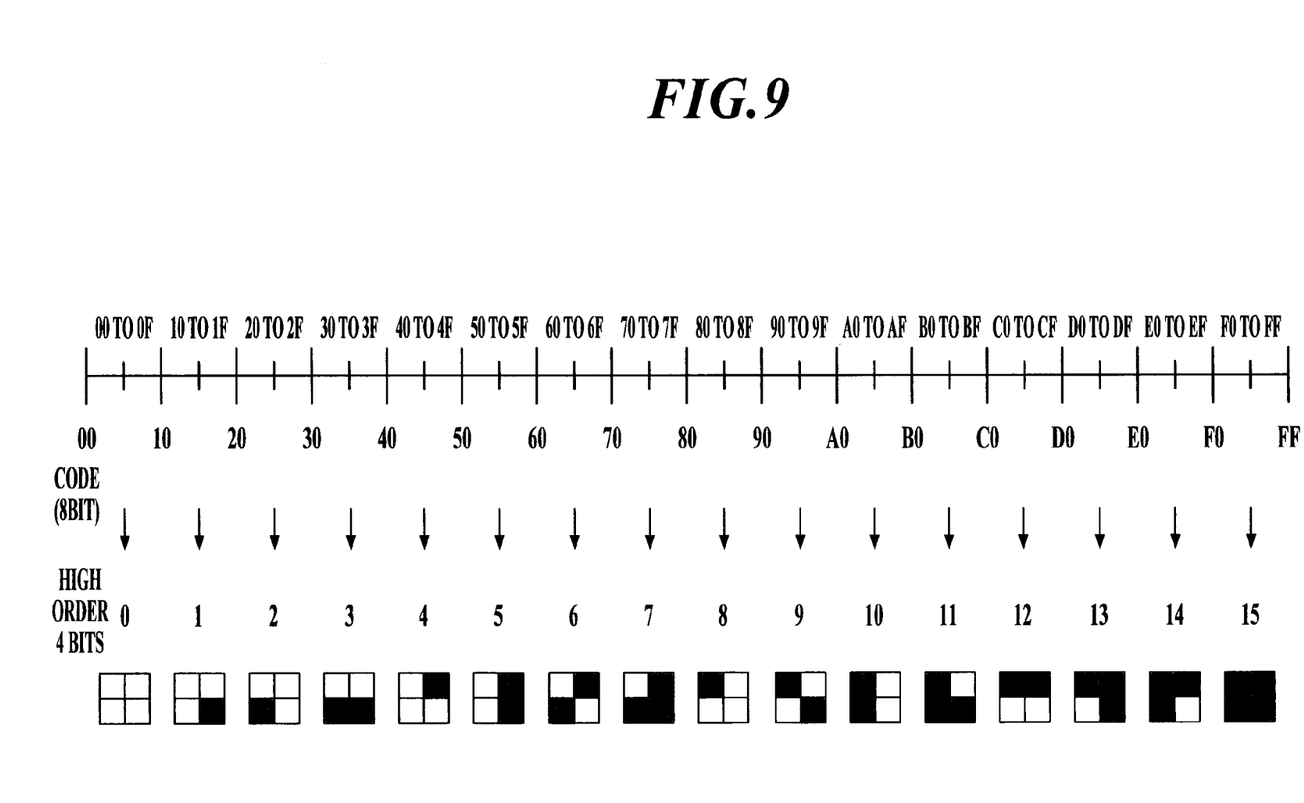
FIG. 9 is a view showing a corresponding relationship between the code to be decoded and the decoded data.

Then, the output adjustment section 353 performs the decoding process to the image data of the character or the line drawing. FIG. 9 shows a corresponding relationship between the code (hexadecimal number) and the data value (hexadecimal number) of the high order 4 bits after decoding the code (hexadecimal number). As shown in FIG. 9, the decoding is performed by converting it to the data value of the high order 4 bits shown in FIG. 7B, based on where the code belongs to in the stages obtained by dividing the gradation to 16 stages. For example, when the code is "48", since the code is within a range of 40-4F, the data value of the high order 4 bits after decoding becomes "4". Even if noises are added to the code "48" by the lossy compression process, the code will always become a value within 40-4F if the amount of change by the noise is within the low order 4 bits. That is, if the error is within the low order 4 bits, it is possible to correctly reproduce the original data of the image.

The output adjustment section 353 outputs the decoded image data of the character or the line drawing to the printer section 37. On the other hand, with respect to the image data of the photographic image that is separated from the image data of the character or the line drawing, since the encoding is not performed, it is outputted to the printer section 37 without decoding it. In the printer section 37, the exposure of the image data of the character or the line drawing is performed on one photosensitive by an exposure section for 1200 dpi, and with respect to the image data of the photographic image, the exposure is performed by an exposure section for 600 dpi on the photosensitive drum to form one electrostatic latent image, one image is outputted by developing it. In addition, in a case of only the exposure section such as 1200 dpi, and so on, after a resolution conversion is performed by converting the image data of the photographic image of 600 dpi to 1200 dpi by the output adjustment section 353, it is also good to perform the image output after synthesizing the image data of the character or the line drawing of 1200 dpi.

As mentioned above, according to this embodiment, at the time of the rasterizing process, the gradation value n2 of the image data of the photographic image is set to the high gradation more than the gradation value n1 of the image data of the character or the line drawing, and the resolution m1 of the character or the line drawing is set to high resolution more than the resolution m2 of the image data of the photographic image. Then, the image data of n2 value is made by adding the additional data of 4 bits to the image data for 4 pixels of the character or the line drawing to encode it. Also, with respect to each the image data of the character or the line drawing and the image data of the photographic image, the attribute data TAG indicating the attribute of the image is generated, this is added to the encoded data of the character or the line drawing and the image data of the photographic image. Then, theses are synthesized and outputted to the MFP 30.

Accordingly, in the character or the line drawing and the photographic image, though the image data having different resolution and gradation is generated, at the time of the compression process, the amount of data of each of the image data can become same. Consequently, in the MFP 30, it is not necessary to prepare a hardware for the different compression method, and it is possible to perform the compression process by the same compression method. Also, it is possible to perform the print output of the image by high resolution with respect to the character or the line drawing and by high gradation with respect to the photographic image, and obtain a high quality output image. Thus, it is possible to obtain the high quality output image in a condition that the image portions in which gradation and/or resolution are different mix in one image. Further, this can be realized by a simple composition.

Also, as a result of having performed the lossy compression process by adding the additional data to the lower bit of the image data for 4 pixels of the character or the line drawing, even when the noise is generated, it is possible to suppress the influence to the image data of the high order bit because data changes from the additional data of the lower bit. Generally, since the image data is a large amount of data, the lossy compression process is often performed to obtain a high compression rate. Even if in such a case, it is possible to correctly reproduce the portion of the character or the line drawing with the high resolution, the image quality of which is easily deteriorated by the noise.

Also, according to this embodiment, in the MFP 30, the compression process is performed to the synthesized data, and this is stored in the image memory 36. At the time of printing out, the synthesized data is read from the image memory to perform the extension process. when separating the image data of the character or the line drawing and the image data of the photographic image based on the attribute data TAG among extended data, the image data of the photographic image in the present state is outputted to the printer section 37, and after the encoded data of the character or the line drawing is decoded, the decoded data is outputted to the printer section 37. According to this, it is possible to perform the print outputs by resolutions and gradations of the photographic image and the character or the line drawing respectively, and it is possible to obtain the high quality output image by the simple composition in a condition that the image portions in which gradation and/or resolution are different mix in one image.

In addition, the above mentioned embodiment is an appropriate example for the present invention, the scope of the claims are not limited to this.

For example, when performing color printing by the four colors of Y (yellow), M (magenta), C (cyan), K (black), it is also good to perform the explained processes with respect to each color of the image data. According to this, it is possible to obtain a high quality image with respect to each color of the image. Also, it is also good to perform the printing output of the image data by performing the explained processes only about the image data of K which provides the most visual influence to the resolution of the character or the line drawing without performing the explained processes with respect to the image data of other Y, M, and C. In this case, the process can be efficiently performed because the high resolution of the portion of the character or the line drawing is maintained, and the processing time regarding the image data of Y, M, and C is unnecessary.

Also, though the encoding is performed in the printer controller 20 with respect to the image data of the character or the line drawing, it is also good to perform the encoding in the MFP 30 before the MFP 30 performs the compression process.

Also, in the embodiments, as shown in FIG. 7B, Though the encoding is performed with respect to 4 pixels of the image data of the character or the line drawing as one unit because 1 pixel of the photographic image of 600 dpi corresponds to 4 pixels of the character or the line drawing of 1200 dpi, the pixel number to be collectively encoded is not especially limited. For example, it is also good to perform the encoding by adding the additional data of 7 bits to data (1 bit) of 1 pixel of the character or the line drawing. The pixel number to be encoded should be suitably determined based on the relationship between the amount of data after encoding and the resolution of the portion of the character or the line drawing.

Also, in the embodiments, though an example of the gradation value n1=2 values and the gradation value n2=256 values is explained, any gradation values n1 and n2 can be adapted if a condition n1<n2 is satisfied. Also, the resolutions m1 and m2 are not limited to the example of 1200 dpi and 600 dpi.

In accordance with a first aspect of the present invention, an image processing apparatus comprises:

an image transformation section which generates, from print data, image data of character or line drawing of gradation value n1 and image data of a photographic image of gradation value n2 (n2>n1);

an encoding section which encodes the image data of the character or the line drawing of the gradation value n1, and generates the encoded image data of the character or the line drawing of the gradation value n2;

an attribute adding section which generates attribute data indicating an attribute of each of images with respect to the encoded image data of the character or the line drawing of the gradation value n2 and the generated image data of the photographic image of the gradation value n2, and adds the attribute data to each of the encoded image data of the character or the line drawing and the generated image data of the photographic image; and a synthesizing section which synthesizes the encoded image data of the character or the line drawing to which the attribute data is added and the generated image data of the photographic image to which the attribute data is added, and outputs the synthesized data.

According to the present invention, even when one image includes the character or the line drawing and the photographic image that are different gradation, it is possible to match the amount of data (bit number) of the image data because it unifies to the gradation value n2 in spite of the attribute of the image. Consequently, when performing the compression process of the image data, the simple composition can be obtained because the same compression method can be used in the process. As a result, the photographic image of the high gradation higher than that of the character or the line drawing can be mixed in one the image, and it is possible to obtain a high quality output image by the simple composition.

Preferably, the resolution of the image data of the character or the line drawing generated by the image transformation section is the high resolution higher than that of the image data of the photographic image.

According to this, since the character or the line drawing can be outputted at the high resolution, it is possible to obtain a high quality output image with respect to the character or the line drawing.

Preferably, the encoding section adds the additional data to the lower bit of the image data of the gradation value n1 of the character or the line drawing to generate the image data of the gradation value n2, and generates the encoded data of the gradation value n2 by encoding it.

According to this, it is possible to absorb, by the additional data, change of data occurred when the compression process is performed to the image, and reduce the influence of the noise to the character or the line drawing a high resolution of which is desired. Accordingly, it is possible to prevent the deterioration of the image quality of the character or the line drawing in the output image.

Preferably, the image processing apparatus further comprises:

a compression processing section which performs a compression process of the synthesized data outputted by the synthesizing section to generate the compressed data;

an image storage section which stores the compressed data generated by the compression processing section;

an extension section which performs a extension process to the compressed data stored by the image storage section to obtain the extended synthesized data; and an output adjustment section which separates the extended synthesized data into the encoded image data of the character or the line drawing and the image data of the photographic image, decodes the separated encoded image data of the character or the line drawing to obtain the decoded image data of the character or the line drawing, and outputs the decoded image data of the character or the line drawing and the separated image data of the photographic image.

Preferably, the output adjustment section detects the attribute data included in the synthesized data, and separates the synthesized data to the image data of the character or the line drawing and image dada of the photographic image based on the attribute data.

According to this, it is possible to output the character or the line drawing and the photographic image each having different gradations and/or resolutions at each gradation and/or resolution. Consequently, it is possible to obtain the high quality output image by the simple composition.

Preferably, the compression process section performs the compression process of the same compression method to each of the image data of the character or the line drawing and the image data of the photographic image.

According to this, even when one image includes different gradation and/or the resolution in image portions, it is possible to perform the compression process by the same compression method. Consequently, since only one compression method corresponding to the process composition relating to a compression process is prepared, the simple composition can be provided.

Preferably, the compression process section performs the compression process of the image data among the synthesized data by the lossy compression method, and performs the compression process of the attribute data by the lossless compression method.

Also, in accordance with a second aspect of the present invention, a data processing method in an image processing apparatus, comprises the steps of:

generating, from print data, image data of character or line drawing of gradation value n1 and image data of a photographic image of gradation value n2 (n2>n1);

encoding the image data of the character or the line drawing of the gradation value n1, and generating the encoded image data of the character or the line drawing of the gradation value n2;

generating attribute data indicating an attribute of each of images with respect to the encoded image data of the character or the line drawing of the gradation value n2 and the generated image data of the photographic image of the gradation value n2, and adding the attribute data to each of the encoded image data of the character or the line drawing of the gradation value n2 and the generated image data of the photographic image; and synthesizing the encoded image data of the character or the line drawing to which the attribute data is added and the generated image data of the photographic image to which the attribute data is added, and outputs the synthesized data.

Preferably, the resolution of the image data of the character or the line drawing is a high resolution higher than that of the image data of the photographic image.

Preferably, the encoding is performed by adding the additional data to the lower bit of the image data of the gradation value n1 of the character or the line drawing to generate the image data of the gradation value n2, and the encoded data of the gradation value n2 is generated by encoding it.

In accordance with a third aspect of the present invention, a printing system comprises:

a print control apparatus for processing received print data; and an image forming apparatus for printing and outputting an image based on image data, wherein the print control apparatus comprises:

an image transformation section which generates, from print data, image data of character or line drawing of gradation value n1 and image data of a photographic image of gradation value n2 (n2>n1);

an encoding section which encodes the image data of the character or the line drawing of the gradation value n1, and generates the encoded image data of the character or the line drawing of the gradation value n2;

an attribute adding section which generates attribute data indicating an attribute of each of images with respect to the encoded image data of the character or the line drawing of the gradation value n2 and the generated image data of the photographic image of the gradation value n2, and adds the attribute data to each of the encoded image data of the character or the line drawing and the generated image data of the photographic image; and a synthesizing section which synthesizes the encoded image data of the character or the line drawing to which the attribute data is added and the generated image data of the photographic image, and outputs the synthesized data to which the attribute data is added.

Preferably, the resolution of the image data of the character or the line drawing generated by the image transformation section is a high resolution higher than that of the image data of the photographic image.

Preferably, the encoding section adds the additional data to the lower bit of the image data of the gradation value n1 of the character or the line drawing to generate the image data of the gradation value n2, the encoded data of the gradation value n2 is generated by encoding it.

Preferably, the image processing apparatus further comprises:

a compression processing section which performs a compression process of the synthesized data outputted by the synthesizing section to generate the compressed data;

an image storage section which stores the compressed data generated by the compression processing section;

an extension section which performs a extension process to the compressed data stored by the image storage section to obtain the extended synthesized data; and an output adjustment section which separates the extended synthesized data into the encoded image data of the character or the line drawing and the image data of the photographic image, decodes the separated encoded image data of the character or the line drawing to obtain the decoded image data of the character or the line drawing, and outputs the decoded image data of the character or the line drawing and the separated image data of the photographic image.

Preferably, the output adjustment section detects the attribute data included in the synthesized data, the synthesized data is separated to the image data of the character or the line drawing and the image data of the photographic image based on the attribute data.

Preferably, the compression process section performs the compression process of the same compression method to each of the image data of the character or the line drawing and the image data of the photographic image.

Preferably, the compression process section performs the compression process of the image data among the synthesized data by lossy compression method, and the compression process of the attribute data among the synthesized data by the lossless compression method.

Preferably, the image forming apparatus comprises:

a first image forming section of a first resolution; and a second image forming section of a high resolution higher than that of the first the resolution, wherein the first image forming section forms an image based on an image data of a photographic image outputted from an output adjustment section, and the second image forming section forms an image based on an decoded image data of the character or the line drawing outputted from the output adjustment section.

The entire disclosure of Japanese Patent Applications No. 2007-187019 filed on Jul. 18, 2007 including specifications, claims, drawings and summaries are incorporated herein by reference in their entirety.

What is claimed is:

1. An image processing apparatus comprising:
   an image transformation section which generates, from print data, image data of character or line drawing of gradation value n1 and image data of a photographic image of gradation value n2 (n2>n1);
   an encoding section which encodes the image data of the character or the line drawing of the gradation value n1, and generates the encoded image data of the character or the line drawing of the gradation value n2;
   an attribute adding section which generates attribute data indicating an attribute of each of images with respect to the encoded image data of the character or the line drawing of the gradation value n2 and the generated image data of the photographic image of the gradation value n2, and adds the attribute data to each of the encoded image data of the character or the line drawing and the generated image data of the photographic image; and
   a synthesizing section which synthesizes the encoded image data of the character or the line drawing to which the attribute data is added and the generated image data of the photographic image to which the attribute data is added, and outputs the synthesized data.

2. The image processing apparatus according to claim 1, wherein a resolution of the image data of the character or the line drawing generated by the image transformation section is higher than a resolution of the image data of the photographic image.

3. The image processing apparatus according to claim 1, wherein the encoding section generates the encoded image data of the gradation value n2 by adding additional data to a lower bit of the image data of the character or the line drawing of the gradation value n1.

4. The image processing apparatus according to claim 1, further comprising:
   a compression processing section which performs a compression process of the synthesized data outputted by the synthesizing section to generate the compressed data;
   an image storage section which stores the compressed data generated by the compression processing section;
   an extension section which performs a extension process to the compressed data stored by the image storage section to obtain the extended synthesized data; and
   an output adjustment section which separates the extended synthesized data into the encoded image data of the character or the line drawing and the image data of the photographic image, decodes the separated encoded image data of the character or the line drawing to obtain the decoded image data of the character or the line drawing, and outputs the decoded image data of the character or the line drawing and the separated image data of the photographic image.

5. The image processing apparatus according to claim 4, wherein the output adjustment section detects the attribute data contained in the synthesized data, and separates the synthesized data into the image data of the character or the line drawing and the image data of the photographic image based on the attribute data.

6. The image processing apparatus according to claim 4, wherein the compression processing section performs the compression process of a same compression method to both the image data of the character or the line drawing and the image data of the photographic image.

7. The image processing apparatus according to claim 4, wherein the compression processing section performs the compression process by a lossy compression method to the image data of the synthesized data, and performs the compression process by a lossless compression method to the attribute data.

8. A data processing method in an image processing apparatus, comprising the steps of:
   generating, from print data, image data of character or line drawing of gradation value n1 and image data of a photographic image of gradation value n2 (n2>n1);
   encoding the image data of the character or the line drawing of the gradation value n1, and generating the encoded image data of the character or the line drawing of the gradation value n2;
   generating attribute data indicating an attribute of each of images with respect to the encoded image data of the character or the line drawing of the gradation value n2 and the generated image data of the photographic image of the gradation value n2, and adding the attribute data to each of the encoded image data of the character or the line drawing and the generated image data of the photographic image; and
   synthesizing the encoded image data of the character or the line drawing to which the attribute data is added and the generated image data of the photographic image to which the attribute data is added, and outputs the synthesized data.

9. The data processing method according to claim 8, wherein a resolution of the image data of the character or the line drawing is higher than a resolution of the image data of the photographic image.

10. The data processing method according to claim 8, wherein the encoding step generates encoded image data of the gradation value n2 by adding additional data to a lower bit of the image data of the character or the line drawing of the gradation value n1.

11. A printing system comprising:
   a print control apparatus for processing received print data; and
   an image forming apparatus for printing and outputting an image based on image data 1 wherein the print control apparatus comprises:
   an image transformation section which generates/ from print data 1 image data of character or line drawing of gradation value n1 and image data of a photographic image of gradation value n2 (n2>n1);
   an encoding section which encodes the image data of the character or the line drawing of the gradation value n1, and generates the encoded image data of the character or the line drawing of the gradation value n2;
   an attribute adding section which generates attribute data indicating an attribute of each of images with respect to the encoded image data of the character or the line drawing of the gradation value n2 and the generated image data of the photographic image of the gradation value n2, and adds the attribute data to each of the encoded image data of the character or the line drawing and the generated image data of the photographic image; and
   a synthesizing section which synthesizes the encoded image data of the character or the line drawing to which the attribute data is added and the generated image data of the photographic image to which the attribute data is added, and outputs the synthesized data.

12. The printing system according to claim 11, wherein a resolution of the image data of the character or the line drawing generated by the image transformation section is higher than a resolution of the image data of the photographic image.

13. The printing system according to claim 11, wherein the encoding section generates the encoded image data of the gradation value n2 by adding additional data to a lower bit of the image data of the character or the line drawing of the gradation value n1.

14. The printing system according to claim 11, wherein the image forming apparatus comprising:
   a compression processing section which performs a compression process of the synthesized data outputted by the synthesizing section to generate the compressed data;
   an image storage section which stores the compressed data generated by the compression processing section;
   an extension section which performs a extension process to the compressed data stored by the image storage section to obtain the extended synthesized data; and
   an output adjustment section which separates the extended synthesized data into the encoded image data of the character or the line drawing and the image data of the photographic image, decodes the separated encoded image data of the character or the line drawing to obtain the decoded image data of the character or the line drawing, and outputs the decoded image data of the character or the line drawing and the separated image data of the photographic image.

15. The printing system according to claim 14, wherein the output adjustment section detects the attribute data contained in the synthesized data, and separates the synthesized data into the image data of the character or the line drawing and the image data of the photographic image based on the attribute data.

16. The printing system according to claim 14, wherein the compression processing section performs the compression process of a same compression method to both the image data of the character or the line drawing and the image data of the photographic image.

17. The printing system according to claim 14, wherein the compression processing section performs the compression process by a lossy compression method to the image data of the synthesized data, and performs the compression process by a lossless compression method to the attribute data.

18. The printing system according to claim 14, wherein the image forming apparatus further comprises a first image forming section of a first resolution and a second image forming section of a high resolution more than the first resolution, said first image forming section forms an image based on the image data of the photographic image outputted from the output adjustment section, and the second image forming section forms an image based on the encoded image data of the character and the line drawing outputted from the output adjustment section.

* * * * *